United States Patent
Inoue et al.

(10) Patent No.: US 7,110,226 B2
(45) Date of Patent: Sep. 19, 2006

(54) REGULATOR PROTECTION CIRCUIT AND POWER SUPPLY APPARATUS INCORPORATING IT

(75) Inventors: Koichi Inoue, Kyoto (JP); Masahito Kondo, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 202 days.

(21) Appl. No.: 10/845,483

(22) Filed: May 14, 2004

(65) Prior Publication Data

US 2004/0246636 A1  Dec. 9, 2004

(30) Foreign Application Priority Data

May 14, 2003 (JP) .............................. 2003-136125

(51) Int. Cl.
*H02H 7/00* (2006.01)
*H02H 9/00* (2006.01)

(52) U.S. Cl. .................. 361/18; 361/91.1; 361/100; 361/103; 340/660; 340/661; 340/662; 340/663; 340/584

(58) Field of Classification Search ............. 361/18
See application file for complete search history.

(56) References Cited

U.S. PATENT DOCUMENTS

| | | | | |
|---|---|---|---|---|
| 5,166,854 A | * | 11/1992 | Morishige | 361/91.6 |
| 5,255,149 A | * | 10/1993 | Matsuo | 361/103 |
| 5,437,002 A | * | 7/1995 | Bennett | 392/441 |

FOREIGN PATENT DOCUMENTS

| | | |
|---|---|---|
| JP | 9-191647 A | 7/1997 |
| JP | 2002-145022 | 5/2002 |
| JP | 2003-33015 A | 1/2003 |

* cited by examiner

*Primary Examiner*—Stephen W. Jackson
*Assistant Examiner*—Terrence Willoughby
(74) *Attorney, Agent, or Firm*—Arent Fox, PLLC

(57) ABSTRACT

A power supply apparatus has a regulator and a regulator protection circuit. On detecting an abnormality, an abnormality detection circuit in the regulator protection circuit turns the regulator off. Based on the output of the abnormality detection circuit, an abnormality detection incidence checking circuit in the regulator protection circuit checks whether or not an abnormality has been detected a predetermined number of times within a predetermined length of time. When the abnormality detection incidence checking circuit recognizes that an abnormality has been detected the predetermined number of times within the predetermined length of time, an abnormality detection level setting circuit in the regulator protection circuit decreases the detection level of the abnormality detection circuit. This helps reduce the incidence of malfunctioning of the load to which the regulator feeds its output due to repeated detection of an abnormality and recovery therefrom.

12 Claims, 4 Drawing Sheets

REGULATOR PROTECTION CIRCUIT AND POWER SUPPLY APPARATUS INCORPORATING IT

This application is based on Japanese Patent Application No. 2003-136125 filed on May 14, 2003, the contents of which are hereby incorporated by reference.

BACKGROUND OF THE INVENTION

1. Field of the Invention

The present invention relates to a regulator protection circuit.

2. Description of the Prior Art

An example of the configuration of a conventional power supply apparatus is shown in FIG. 5. The power supply apparatus shown in FIG. 5 is composed of: an overvoltage detection circuit 11 that serves as a regulator protection circuit; and a regulator 10 that converts an input voltage $V_{IN}$ into a predetermined output voltage $V_{OUT}$ and then outputs it. When the input voltage $V_{IN}$ to the regulator 10 becomes equal to or higher than a detection level, the overvoltage detection circuit 11 turns the regulator 10 off; when the input voltage $V_{IN}$ to the regulator 10 becomes equal to or lower than the detection level (or, in a case where hysteresis is introduced, equal to or lower than a recovery level that is lower than the detection level), the overvoltage detection circuit 11 turns the regulator 10 on. In the power supply apparatus shown in FIG. 5, as a result of the overvoltage detection circuit 11 controlling the operation state of the regulator 10 in the manner described above, the regulator 10 is prevented from breakdown due to an overvoltage.

Another example of the configuration of a conventional power supply apparatus is shown in FIG. 6. In FIG. 6, such blocks an signals as are found also in FIG. 5 are identified with the same reference numerals and symbols. The power supply apparatus shown in FIG. 6 is composed of: a thermal shut-down circuit 12 that serves as a regulator protection circuit; and a regulator 10 that converts an input voltage $V_{IN}$ into a predetermined output voltage $V_{OUT}$ and then outputs it. The thermal shut-down circuit 12 is provided with a temperature sensing circuit (not illustrated). When the output voltage of the temperature sensing circuit becomes equal to or higher than a detection level, the thermal shut-down circuit 12 turns the regulator 10 off; when the output voltage of the temperature sensing circuit becomes equal to or lower than the detection level (or, in a case where hysteresis is introduced, equal to or lower than a recovery level that is lower than the detection level), the thermal shut-down circuit 12 turns the regulator 10 on. In the power supply apparatus shown in FIG. 6, as a result of the thermal shut-down circuit 12 controlling the operation state of the regulator 10 in the manner described above, the regulator 10 is prevented from breakdown due to overheat.

However, in the power supply apparatus shown in FIG. 5 described above, in response to successive overvoltage noise pulses, the overvoltage detection circuit 11 repeats detection of the overvoltage and recovery therefrom alternately, and thus the output of the regulator 10 repeats turning on and off alternately. This may cause malfunctioning of the load (for example, a microcomputer) to which the regulator 10 feeds its output.

On the other hand, in the power supply apparatus shown in FIG. 6 described above, when an overloaded state persists or in similar situations, the thermal shut-down circuit 12 detects overheat and turns the regulator 10 off. This temporarily lowers the temperature, but later, when the regulator 10 turns on, overheat occurs again. In this way, in the power supply apparatus shown in FIG. 6 described above, when an overloaded state persists or in similar situations, the thermal shut-down circuit 12 repeats detection of overheat and recovery therefrom alternately, and thus the output of the regulator 10 repeats turning on and off alternately. As a result, the regulator 10 is kept at temperatures around the overheat detection temperature for a long time. This degrades the reliability of the regulator 10.

In the wiper controlling apparatus disclosed in Japanese Patent Application Laid-Open No. 2002-145022, when short-circuiting occurs a predetermined number of times in succession, the operation of the drive circuit is stopped. This helps prevent unnecessary repetition of overheat shut-down protection operation, and thus helps keep the reliability of the circuit satisfactorily high. However, in the wiper controlling apparatus disclosed in Japanese Patent Application Laid-Open No. 2002-145022, also when it receives successive overvoltage noise pulses, it regards them as short-circuiting occurring a plurality of times, and thus stops the operation of the drive circuit. This may make the apparatus unusable simply in response to noise while in fact no short-circuiting is occurring.

SUMMARY OF THE INVENTION

An object of the present invention is to provide a regulator protection circuit that, when used together with a regulator, reduces the occurrence of faults, such as malfunctioning of the load to which the regulator feeds its output and degradation of the reliability of the regulator itself, as results from repeated detection of an abnormality and recovery therefrom. Another object of the present invention is to provide a power supply apparatus provided with such a regulator protection circuit.

To achieve the above objects, according to one aspect of the present invention, a regulator protection circuit is provided with: an abnormality detection circuit that receives an abnormality detection voltage whose level varies according to the operation state of a regulator, that, once the abnormality detection voltage turns from lower than a first threshold level to higher than the first threshold voltage, keeps outputting an abnormality-indicating signal until the abnormality detection voltage becomes lower than a second threshold level that is lower than the first threshold level, and that, once the abnormality detection voltage turns from higher than the second threshold level to lower than the second threshold voltage, keeps outputting a normality-indicating signal until the abnormality detection voltage becomes higher than the first threshold level; an abnormality detection incidence checking circuit that checks, based on the output of the abnormality detection circuit, whether or not the abnormality-indicating and normality-indicating signals have alternated a predetermined number of times within a predetermined length of time; and an abnormality detection level setting circuit that, when the abnormality detection incidence checking circuit recognizes that the abnormality-indicating and normality-indicating signals have alternated the predetermined number of times within the predetermined length of time, decreases at least the second threshold level out of the first and second threshold levels.

According to another aspect of the present invention, a power supply apparatus is provided with: a regulator protection circuit configured as described above; and a regulator that has the operation state thereof controlled by a signal outputted from the abnormality detection circuit of the regulator protection circuit in such a way as to be turned on when the signal outputted from the abnormality detection circuit of the regulator protection circuit is the normality-indicating signal and turned off when the signal outputted from the abnormality detection circuit of the regulator protection circuit is the abnormality-indicating signal.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
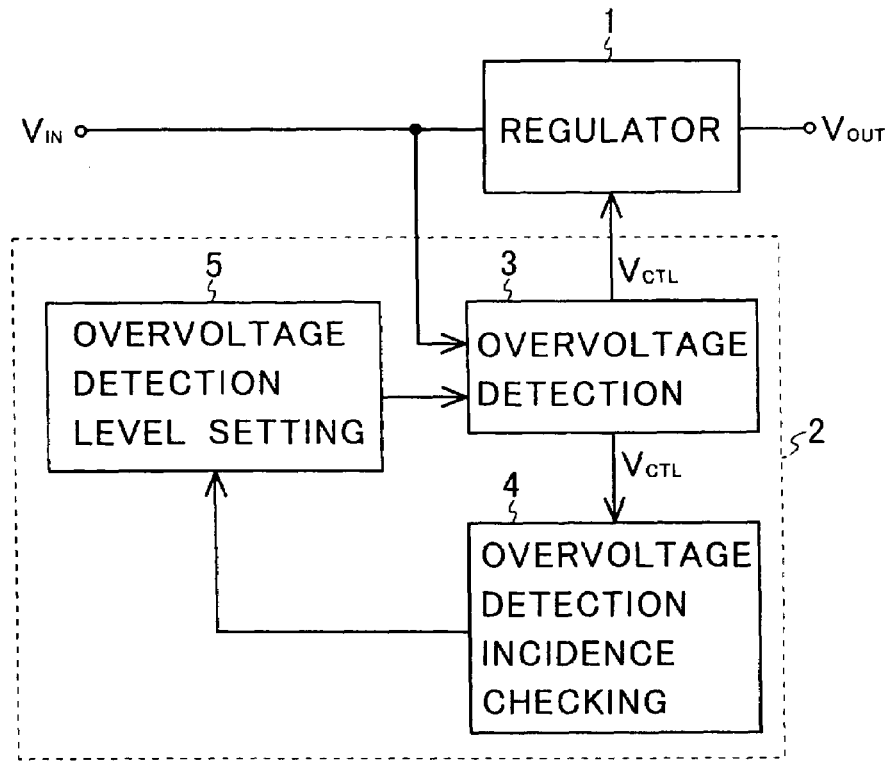
FIG. 1 is a diagram showing an example of the configuration of a power supply apparatus embodying the invention.

Hereinafter, an embodiment of the present invention will be described with reference to the drawings. An example of the configuration of a power supply apparatus embodying the invention is shown in FIG. 1. The power supply apparatus shown in FIG. 1 is composed of a regulator 1 and a regulator protection circuit 2. When the control voltage $V_{CTL}$ fed from the regulator protection circuit 2 to the regulator 1 is a normality-indicating signal, the regulator 1 is kept on, and thus the regulator 1 converts the input voltage $V_{IN}$ into a voltage having a predetermined level and outputs this voltage as the output voltage $V_{OUT}$. On the other hand, when the control voltage $V_{CTL}$ fed from the regulator protection circuit 2 to the regulator 1 is an abnormality-indicating signal, the regulator 1 is kept off, and thus the regulator 1 stops its output.

The regulator protection circuit 2 generates the control voltage $V_{CTL}$ based on the input voltage $V_{IN}$, and controls the operation state of the regulator 1 by feeding the control voltage $V_{CTL}$ to the regulator 1. The regulator protection circuit 2 is composed of an overvoltage detection circuit 3, an overvoltage detection incidence checking circuit 4, and an overvoltage detection level setting circuit 5.

The overvoltage detection circuit 3 receives the input voltage $V_{IN}$, and also receives a detection voltage $V_D$ and a recovery voltage $V_R$ outputted from the overvoltage detection level setting circuit 5. In this embodiment, hysteresis is introduced in the detection of an overvoltage by making the recovery voltage $V_R$ lower than the detection voltage $V_D$. Once the input voltage $V_{IN}$ turns from lower than the detection voltage $V_D$ to higher than the detection voltage $V_D$, until the input voltage $V_{IN}$ later becomes lower than the recovery voltage $V_R$, the overvoltage detection circuit 3 keeps feeding a low level as the control voltage $V_{CTL}$ (an abnormality-indicating signal) to the regulator 1 and to the overvoltage detection incidence checking circuit 4. Moreover, once the input voltage $V_{IN}$ turns from higher than the recovery voltage $V_R$ to lower than the recovery voltage $V_R$, until the input voltage $V_{IN}$ later becomes higher than the detection voltage $V_D$, the overvoltage detection circuit 3 keeps feeding a high level as the control voltage $V_{CTL}$ (a normality-indicating signal) to the regulator 1 and to the overvoltage detection incidence checking circuit 4.

The overvoltage detection incidence checking circuit 4 checks whether or not an overvoltage has been detected a predetermined number of times (for example, three times) within a predetermined length of time T (see FIGS. 3A to 3D). Specifically, when the control voltage $V_{CTL}$ turns from high to low, the overvoltage detection incidence checking circuit 4 starts to measure, with a timer (not illustrated) incorporated therein, the lapse of time, and then counts, with a counter (not illustrated) incorporated therein, how many times the control voltage $V_{CTL}$ is inverted so as to ultimately check whether or not the count has reached a predetermined number (for example, in a case where an overvoltage is detected three times, four). When an overvoltage is detected the predetermined number of times within the predetermined length of time T, the overvoltage detection incidence checking circuit 4 immediately feeds the overvoltage detection level setting circuit 5 with a signal that instructs it to shift the overvoltage detection level, and simultaneously resets the incorporated timer and counter. Thereafter, when the control voltage $V_{CTL}$ turns from low to high, the overvoltage detection incidence checking circuit 4 feeds the overvoltage detection level setting circuit 5 with a signal that instructs it to recover from the shifted overvoltage detection level.

The overvoltage detection level setting circuit 5 is provided with: four constant voltage sources (not illustrated) that output different voltages from one another; and a switch circuit (not illustrated) that, according to the signal outputted from the overvoltage detection incidence checking circuit 4, the connection between those constant voltage circuits and the overvoltage detection circuit 3. Here, it is assumed that the output voltages of the four constant voltage sources are $V_1$, $V_2$, $V_3$, and $V_4$ ($V_1<V_3$, $V_1<V_2$, $V_2<V_4$, and $V_3<V_4$). In normal condition, the overvoltage detection level setting circuit 5 feeds the overvoltage detection circuit 3 with the voltage $V_4$ as the detection voltage $V_D$ and with the voltage $V_3$ as the recovery voltage $V_R$. On the other hand, in abnormal condition, i.e., after the overvoltage detection level setting circuit 5 receives from the overvoltage detection incidence checking circuit 4 a signal that requests a shift in the overvoltage detection level until the overvoltage detection level setting circuit 5 receives from the overvoltage detection incidence checking circuit 4 a signal that requests recovery from the shifted overvoltage detection level, the overvoltage detection level setting circuit 5 feeds the overvoltage detection circuit 3 with the voltage $V_2$ as the detection voltage $V_D$ and with the voltage $V_1$ as the recovery voltage $V_R$.

Figure 3:
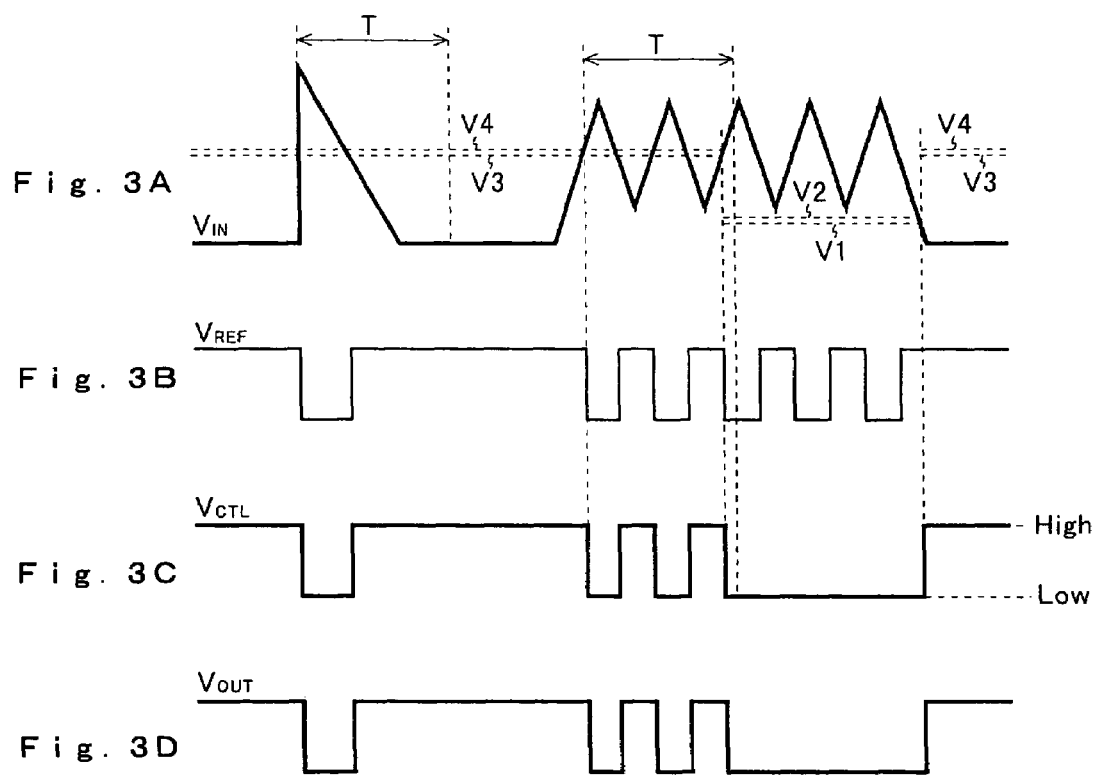
FIGS. 3A to 3D are time charts showing the voltages observed at relevant points in the power supply apparatus shown in FIG. 1.
Figure 5:
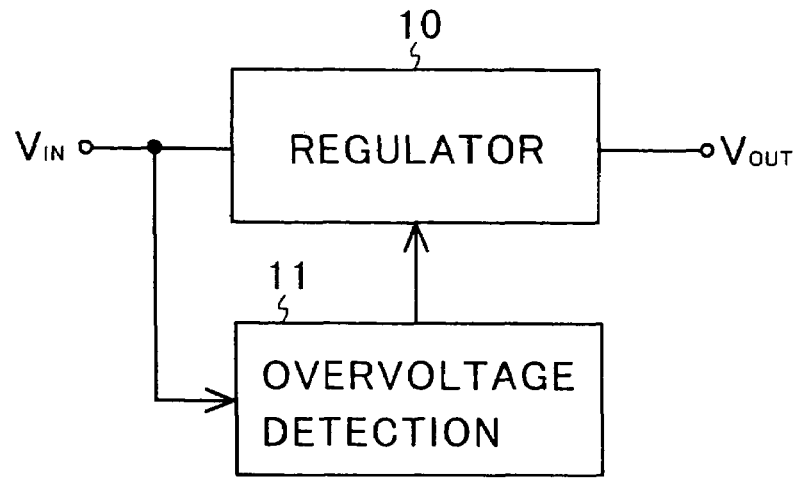
FIG. 5 is a diagram showing an example of the configuration of a conventional power supply apparatus.

As a result of the regulator protection circuit 2 operating as described above, as shown in FIGS. 3A to 3D, even when successive overvoltage noise pulses (for example, several noise pulses that occur successively at time intervals of several ten milliseconds) are superimposed on the input voltage $V_{IN}$, if the overvoltage is detected the predetermined number of times within the predetermined length of time T, the overvoltage detection level (specifically, the detection voltage $V_D$ and the recovery voltage $V_R$) is decreased to eliminate or reduce the incidence of the output of the regulator 1 being repeatedly turned on and off alternately. This helps reduce the occurrence of malfunctioning of the load (for example, a microcomputer) to which the regulator 1 feeds its output. It should be noted that the voltage $V_{REF}$ shown in FIG. 3B is the output voltage of the power supply apparatus shown in FIG. 5 as observed when the input voltage $V_{IN}$ shown in FIG. 3A is fed to the power supply apparatus shown in FIG. 5. In this case, in response to the successive overvoltage noise pulses superimposed on the input voltage $V_{IN}$, the regulator output is repeatedly turned on and off alternately.

In this embodiment described above, when the overvoltage detection incidence checking circuit 4 detects an overvoltage the predetermined number of times within the predetermined length of time T, the overvoltage detection level setting circuit 5 makes both the detection voltage $V_D$ and the recovery voltage $V_R$ lower than they normally are. It is, however, also possible to make only the recovery voltage $V_R$ lower than it normally is.

In this embodiment, if the voltage $V_1$, when the recovery voltage is set equal thereto, never becomes lower than the noise level of the input voltage $V_{IN}$, the output of the regulator 1 is repeatedly turned on and off alternately as conventionally experienced. To avoid this, it is preferable that the hysteresis width (the difference between the voltages $V_2$ and $V_1$) used when the overvoltage detection level is shifted be larger than the hysteresis width (the difference between the voltages $V_4$ and $V_3$) used when the overvoltage detection level is not shifted. This helps reduce, even if the voltage $V_1$, when the recovery voltage is set equal thereto, never becomes lower than the noise level of the input voltage $V_{IN}$, the incidence of the output of the regulator 1 being turned on and off alternately. In this case, after the overvoltage detection incidence checking circuit 4 detects an overvoltage the predetermined number of times within the predetermined length of time T and then resets the incorporated timer and counter, the timing with which the overvoltage detection level setting circuit 5 is fed with a signal that instructs it to recover from the shifted overvoltage detection level is not when the control voltage $V_{CTL}$ turns from low to high but, for example, a predetermined period of time after the resetting of the incorporated timer and counter.

In this embodiment, to introduce hysteresis in the detection of an overvoltage, the recovery voltage $V_R$ is made lower than the detection voltage $V_D$. It is, however, also possible to make the recovery voltage $V_R$ and the detection voltage $V_D$ equal and do without hysteresis in the detection of an overvoltage. Doing without hysteresis in the detection of an overvoltage helps make the circuit configuration of the overvoltage detection circuit 3 and the overvoltage detection level setting circuit 5 simpler.

In this embodiment, the overvoltage detection level is shifted between two levels. It is, however, also possible to shift the overvoltage detection level among n levels (where n>2). In a case where the overvoltage detection level is shifted among n levels, the overvoltage detection incidence checking circuit 4 receives the input voltage $V_{IN}$, detects the minimum level of the input voltage $V_{IN}$ within the period after the incorporated timer starts to measure the lapse of time until an overvoltage is detected a predetermined number of times within a predetermined length of time T, and feeds information on that minimum level to the overvoltage detection level setting circuit 5. The overvoltage detection level setting circuit 5 then sets the overvoltage detection level in such a way that the recovery voltage $V_R$ is lower than the minimum level of the input voltage $V_{IN}$ within the aforementioned period. This helps more surely reduce the incidence of the output of the regulator 1 being repeatedly turned on and off alternately.

Figure 2:
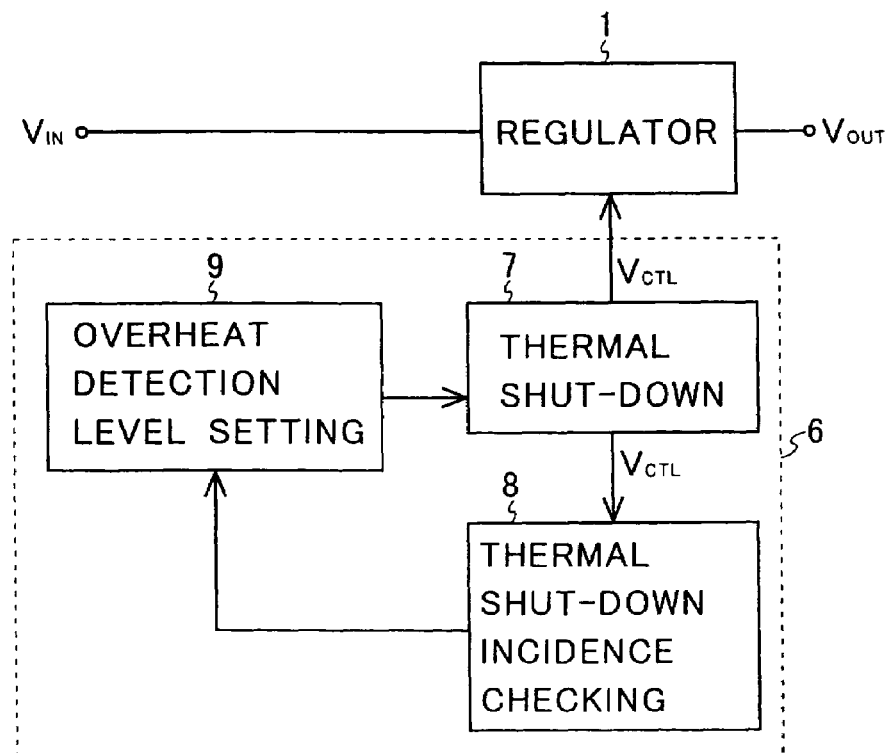
FIG. 2 is a diagram showing another example of the configuration of a power supply apparatus embodying the invention.

Another example of the configuration of a power supply apparatus embodying the invention is shown in FIG. 2. In FIG. 2, such blocks and signals as are found also in FIG. 1 are identified with the same reference numerals and symbols. The power supply apparatus shown in FIG. 2 is composed of a regulator 1 and a regulator protection circuit 6. When the control voltage $V_{CTL}$ fed from the regulator protection circuit 6 to the regulator 1 is a normality-indicating signal, the regulator 1 is kept on, and thus the regulator 1 converts the input voltage $V_{IN}$ into a voltage having a predetermined level and outputs this voltage as the output voltage $V_{OUT}$. On the other hand, when the control voltage $V_{CTL}$ fed from the regulator protection circuit 6 to the regulator 1 is an abnormality-indicating signal, the regulator 1 is kept off, and thus the regulator 1 stops its output.

The regulator protection circuit 6 generates the control voltage $V_{CTL}$ based on a voltage $V_{SEN}$ that is generated internally according to the ambient temperature, and controls the operation state of the regulator 1 by feeding the control voltage $V_{CTL}$ to the regulator 1. The regulator protection circuit 6 is composed of a thermal shut-down circuit 7, a thermal shut-down incidence checking circuit 8, and an overheat detection level setting circuit 9.

The thermal shut-down circuit 7 incorporates a temperature sensor circuit (not illustrated) that outputs the voltage $V_{SEN}$ according to the ambient temperature. Moreover, the thermal shut-down circuit 7 receives a detection voltage $V_D$ and a recovery voltage $V_R$ outputted from the overheat detection level setting circuit 9. In this embodiment, hysteresis is introduced in the detection of overheat by making the recovery voltage $V_R$ lower than the detection voltage $V_D$. Once the output voltage $V_{SEN}$ of the incorporated temperature sensor circuit turns from lower than the detection voltage $V_D$ to higher than the detection voltage $V_D$, until the voltage $V_{SEN}$ later becomes lower than the recovery voltage $V_R$, the thermal shut-down circuit 7 keeps feeding a low level as the control voltage $V_{CTL}$ (an abnormality-indicating signal) to the regulator 1 and to the thermal shut-down incidence checking circuit 8. Moreover, once the output voltage $V_{SEN}$ of the incorporated temperature sensor circuit turns from higher than the recovery voltage $V_R$ to lower than the recovery voltage $V_R$, until the voltage $V_{SEN}$ later becomes higher than the detection voltage $V_D$, the thermal shut-down circuit 7 keeps feeding a high level as the control voltage $V_{CTL}$ (a normality-indicating signal) to the regulator 1 and to the thermal shut-down incidence checking circuit 8.

The thermal shut-down incidence checking circuit 8 checks whether or not overheat has been detected a predetermined number of times (for example, three times) within a predetermined length of time T (see FIGS. 4A to 4D). Specifically, when the control voltage $V_{CTL}$ turns from high to low, the thermal shut-down incidence checking circuit 8 starts to measure, with a timer (not illustrated) incorporated therein, the lapse of time, and then counts, with a counter (not illustrated) incorporated therein, how many times the control voltage $V_{CTL}$ is inverted so as to ultimately check whether or not the count has reached a predetermined number (for example, in a case where overheat is detected three times, four). When overheat is detected the predetermined number of times within the predetermined length of time T, the thermal shut-down incidence checking circuit 8 immediately feeds the overheat detection level setting circuit 9 with a signal that instructs it to shift the overheat detection level, and simultaneously resets the incorporated timer and counter. A predetermined period of time thereafter, the thermal shut-down incidence checking circuit 8 feeds the overheat detection level setting circuit 9 with a signal that instructs it to recover from the shifted overheat detection level.

The overheat detection level setting circuit 9 is provided with: four constant voltage sources (not illustrated) that output different voltages from one another; and a switch circuit (not illustrated) that, according to the signal outputted from the thermal shut-down incidence checking circuit 8, the connection between those constant voltage circuits and the thermal shut-down circuit 7. Here, it is assumed that the output voltages of the four constant voltage sources are $V_1$, $V_2$, $V_3$, and $V_4$ ($V_1<V_3$, $V_1<V_2$, $V_2<V_4$, and $V_3<V_4$). In normal condition, the overheat detection level setting circuit 9 feeds the thermal shut-down circuit 7 with the voltage $V_4$ as the detection voltage $V_D$ and with the voltage $V_3$ as the recovery voltage $V_R$. On the other hand, in abnormal condition, i.e., after the overheat detection level setting circuit 9 receives from the thermal shut-down incidence checking circuit 8 a signal that requests a shift in the overheat detection level until the overheat detection level setting circuit 9 receives from the thermal shut-down incidence checking circuit 8 a signal that requests recovery from the shifted overheat detection level, the overheat detection level setting circuit 9 feeds the thermal shut-down circuit 7 with the voltage $V_2$ as the detection voltage $V_D$ and with the voltage $V_1$ as the recovery voltage $V_R$. Moreover, the hysteresis width (the difference between the voltages $V_2$ and $V_1$) used when the overheat detection level is shifted is made larger than the hysteresis width (the difference between the voltages $V_4$ and $V_3$) used when the overheat detection level is not shifted.

Figure 4:
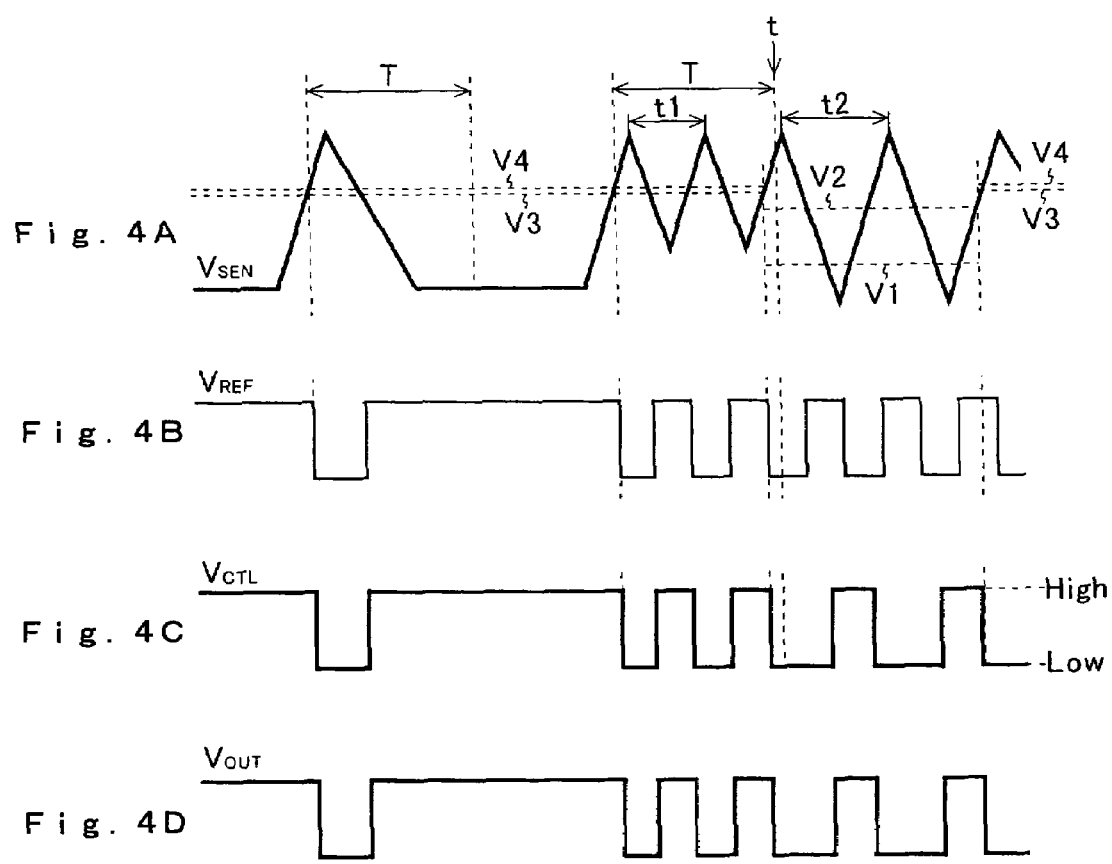
FIGS. 4A to 4D are time charts showing the voltages observed at relevant points in the power supply apparatus shown in FIG. 2.
Figure 6:
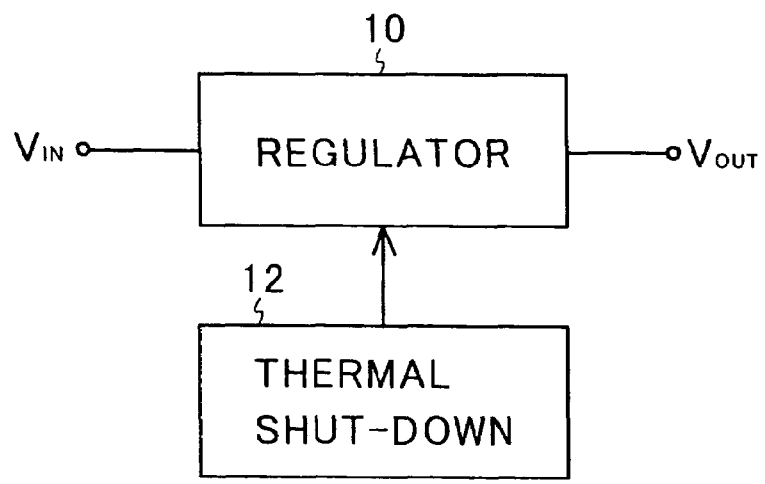
FIG. 6 is a diagram showing another example of the configuration of a conventional power supply apparatus.

As a result of the regulator protection circuit 6 operating as described above, as shown in FIGS. 4A to 4D, even when the output voltage $V_{SEN}$ of the temperature sensor circuit incorporated in the thermal shut-down circuit 7 has a waveform that indicates repeated occurrence of overheat (for example, overheat occurring several times in a period of several seconds), if overheat is detected the predetermined number of times within the predetermined length of time T, the overheat detection level (specifically, the detection voltage $V_D$ and the recovery voltage $V_R$) is decreased, and in addition the hysteresis width is made larger, resulting in a longer temperature variation period ($t_1<t_2$). This helps reduce the incidence of the output of the regulator 1 being repeatedly turned on and off alternately, helps lower the average temperature of the regulator 1, helps prevent the regulator 1 form being kept at temperatures close to the overheat detection temperature, and helps prevent degradation of the reliability of the regulator 1. It should be noted that the voltage $V_{REF}$ shown in FIG. 4B is the output voltage of the power supply apparatus shown in FIG. 6 as observed when the output voltage of the temperature sensor provided in the thermal shut-down circuit 12 in the power supply apparatus shown in FIG. 6 up to the time point t is equal to the voltage $V_{SEN}$ shown in FIG. 4A. In this case, in response to the repeated occurrence of overheat, the regulator output is repeatedly turned on and off alternately.

In this embodiment described above, when the thermal shut-down incidence checking circuit 8 detects overheat the predetermined number of times within the predetermined length of time T, the overheat detection level setting circuit 9 makes both the detection voltage $V_D$ and the recovery voltage $V_R$ lower than they normally are. It is, however, also possible to make only the recovery voltage $V_R$ lower than it normally is.

In this embodiment, to introduce hysteresis in the detection of overheat, the recovery voltage $V_R$ is made lower than the detection voltage $V_D$. It is, however, also possible to make the recovery voltage $V_R$ and the detection voltage $V_D$ equal and do without hysteresis in the detection of overheat. Doing without hysteresis in the detection of overheat helps make the circuit configuration of the thermal shut-down circuit 7 and the overheat detection level setting circuit 9 simpler.

In this embodiment, the overheat detection level is shifted between two levels. It is, however, also possible to shift the overheat detection level among n levels (where n>2). In a case where the overheat detection level is shifted among n levels, the thermal shut-down incidence checking circuit 8 receives the output voltage $V_{SEN}$ of the temperature sensor circuit provided in the thermal shut-down circuit 7, detects the minimum level of the voltage $V_{SEN}$ within the period after the incorporated timer starts to measure the lapse of time until overheat is detected a predetermined number of times within a predetermined length of time T, and feeds information on that minimum level to the overheat detection level setting circuit 9. The overheat detection level setting circuit 9 then sets the overheat detection level in such a way that the recovery voltage $V_R$ is lower than the minimum level of the voltage $V_{SEN}$ within the aforementioned period. This helps more surely reduce the incidence of the output of the regulator 1 being repeatedly turned on and off alternately.

In this embodiment, the thermal shut-down circuit 7 incorporates the temperature sensor circuit. It is, however, also possible to externally fit a temperature sensor to the regulator protection circuit 6 instead of providing a temperature sensor circuit inside the regulator protection circuit 6.

What is claimed is:

1. A regulator protection circuit comprising:
   an abnormality detection circuit
      that receives an abnormality detection voltage whose level varies according to an operation state of a regulator,
      that, once the abnormality detection voltage turns from lower than a first threshold level to higher than the first threshold voltage, keeps outputting an abnormality-indicating signal until the abnormality detection voltage becomes lower than a second threshold level that is equal to or lower than the first threshold level, and
      that, once the abnormality detection voltage turns from higher than the second threshold level to lower than the second threshold voltage, keeps outputting a normality-indicating signal until the abnormality detection voltage becomes higher than the first threshold level;
   an abnormality detection incidence checking circuit that checks, based on an output of the abnormality detection circuit, whether or not the abnormality-indicating and normality-indicating signals have alternated a predetermined number of times within a predetermined length of time; and
   an abnormality detection level setting circuit that, when the abnormality detection incidence checking circuit recognizes that the abnormality-indicating and normality-indicating signals have alternated the predetermined number of times within the predetermined length of time, decreases at least the second threshold level out of the first and second threshold levels.

2. A regulator protection circuit as claimed in claim 1, wherein the abnormality detection voltage is based on an input voltage to the regulator.

3. A regulator protection circuit as claimed in claim 1,
wherein as the abnormality detection voltage is used an output voltage of a temperature sensor that outputs a voltage commensurate with an ambient temperature.

4. A regulator protection circuit as claimed in claim 1,
wherein, when the abnormality detection incidence checking circuit recognizes that the abnormality-indicating and normality-indicating signals have alternated the predetermined number of times within the predetermined length of time, the abnormality detection level setting circuit makes the second threshold level lower than a minimum level of the abnormal detection voltage within the predetermined length of time.

5. A regulator protection circuit as claimed in claim 2,
wherein, when the abnormality detection incidence checking circuit recognizes that the abnormality-indicating and normality-indicating signals have alternated the predetermined number of times within the predetermined length of time, the abnormality detection level setting circuit makes the second threshold level lower than a minimum level of the abnormal detection voltage within the predetermined length of time.

6. A regulator protection circuit as claimed in claim 3,
wherein, when the abnormality detection incidence checking circuit recognizes that the abnormality-indicating and normality-indicating signals have alternated the predetermined number of times within the predetermined length of time, the abnormality detection level setting circuit makes the second threshold level lower than a minimum level of the abnormal detection voltage within the predetermined length of time.

7. A power supply apparatus comprising:
a regulator protection circuit; and
a regulator,
wherein the regulator protection circuit includes:
an abnormality detection circuit
   that receives an abnormality detection voltage whose level varies according to an operation state of the regulator,
   that, once the abnormality detection voltage turns from lower than a first threshold level to higher than the first threshold voltage, keeps outputting an abnormality-indicating signal until the abnormality detection voltage becomes lower than a second threshold level that is equal to or lower than the first threshold level, and
   that, once the abnormality detection voltage turns from higher than the second threshold level to lower than the second threshold voltage, keeps outputting a normality-indicating signal until the abnormality detection voltage becomes higher than the first threshold level;
an abnormality detection incidence checking circuit that checks, based on an output of the abnormality detection circuit, whether or not the abnormality-indicating and normality-indicating signals have alternated a predetermined number of times within a predetermined length of time; and
an abnormality detection level setting circuit that, when the abnormality detection incidence checking circuit recognizes that the abnormality-indicating and normality-indicating signals have alternated the predetermined number of times within the predetermined length of time, decreases at least the second threshold level out of the first and second threshold levels, and
wherein the regulator has the operation state thereof controlled by a signal outputted from the abnormality detection circuit of the regulator protection circuit in such a way as to be turned on when the signal outputted from the abnormality detection circuit of the regulator protection circuit is the normality-indicating signal and turned off when the signal outputted from the abnormality detection circuit of the regulator protection circuit is the abnormality-indicating signal.

8. A power supply apparatus as claimed in claim 7,
wherein the abnormality detection voltage is based on an input voltage to the regulator.

9. A power supply apparatus as claimed in claim 7, further comprising:
a temperature sensor that outputs a voltage commensurate with an ambient temperature,
wherein as the abnormality detection voltage is used an output voltage of the temperature sensor.

10. A power supply apparatus as claimed in claim 7,
wherein, when the abnormality detection incidence checking circuit recognizes that the abnormality-indicating and normality-indicating signals have alternated the predetermined number of times within the predetermined length of time, the abnormality detection level setting circuit makes the second threshold level lower than a minimum level of the abnormal detection voltage within the predetermined length of time.

11. A power supply apparatus as claimed in claim 8,
wherein, when the abnormality detection incidence checking circuit recognizes that the abnormality-indicating and normality-indicating signals have alternated the predetermined number of times within the predetermined length of time, the abnormality detection level setting circuit makes the second threshold level lower than a minimum level of the abnormal detection voltage within the predetermined length of time.

12. A power supply apparatus as claimed in claim 9,
wherein, when the abnormality detection incidence checking circuit recognizes that the abnormality-indicating and normality-indicating signals have alternated the predetermined number of times within the predetermined length of time, the abnormality detection level setting circuit makes the second threshold level lower than a minimum level of the abnormal detection voltage within the predetermined length of time.

* * * * *